No. 718,108. PATENTED JAN. 13, 1903.
R. D'UNGER.
RUNNING GEAR FOR VEHICLES.
APPLICATION FILED DEC. 16, 1901.
NO MODEL.
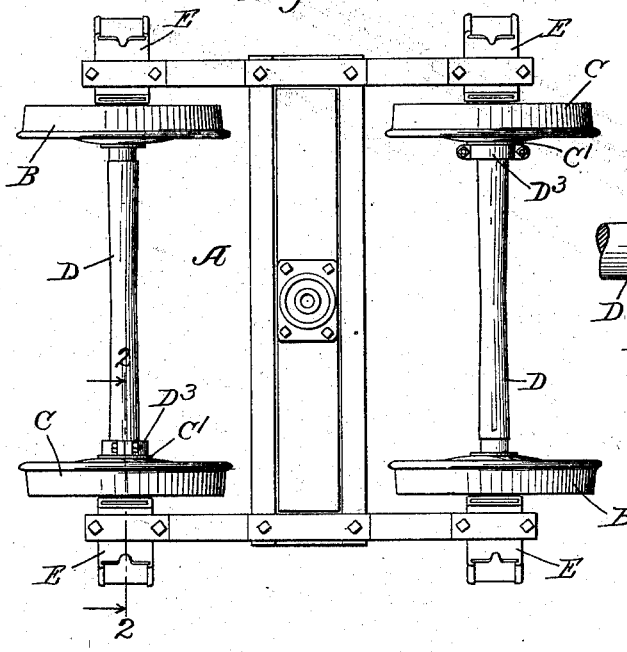
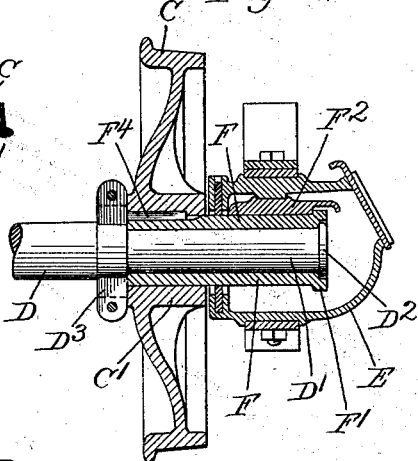
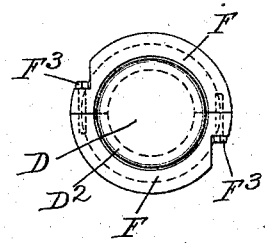
Witnesses.
Edward T. Wray.
Chilton P. Wilson
Inventor.
Robert D'Unger.

UNITED STATES PATENT OFFICE.

ROBERT D'UNGER, OF CHICAGO, ILLINOIS.

RUNNING-GEAR FOR VEHICLES.

SPECIFICATION forming part of Letters Patent No. 718,108, dated January 13, 1903.

Application filed December 16, 1901. Serial No. 86,008. (No model.)

*To all whom it may concern:*

Be it known that I, ROBERT D'UNGER, a citizen of the United States, residing at Chicago, in the county of Cook and State of Illinois, have invented a new and useful running-gear for vehicles of all kinds and trucks for cars of two or more wheels, such as are now used on railway-cars, carriages, wagons, and automobile-trucks, of which the following is a specification.

The invention relates to improvements in the running-gear to vehicles and trucks to railway-cars of all kinds in which one wheel being firmly fixed to the axle the other wheel is journaled loosely at the other end of the axle; and the objects of my improvement are, first, to dispense with the sliding friction of a wheel over a surface where both wheels are firmly fixed to the axle and one wheel has farther to travel than the other; second, to the saving of propelling or drawing power; third, to the increase of velocity at turns and also where one wheel runs higher or lower than the other. I attain these objects by the mechanism illustrated in the accompanying drawings, in which—

Figure 1 is a top plan view of a car-truck. Fig. 2 is a section at the line 2 2 on Fig. 1. Fig. 3 is an end view of an axle.

Similar letters refer to similar parts throughout the several views.

The wheels C C, Fig. 1, are journaled loosely to axle D D, and the wheels B B rigidly fixed to D D and E. The journal-boxes constitute the principal framework of a railway-car truck.

D' in Fig. 2 is the reduced portion of the axle, of the same diameter throughout, free to turn in the sleeve F, the sleeve F encircling D' throughout, with F rigid in the hub C' and keyed at $F^4$, the hub C' fitting against the collar $D^3$, and the flange $D^2$ holding the sleeve F and the wheel C in position against the collar $D^3$.

The outside of the sleeve F, between the flange F' and the hub C', is cylindrical and supports the customary journal-brass $F^2$, with the flange F' holding the journal-brass $F^2$ in position and allowing the sleeve F to turn with the wheel C freely under the journal-brass $F^2$, and the journal-box E rests firmly on the journal-brass $F^2$.

The wheel B and the collar $D^3$ being rigid to the axle D at their respective places and the reduced portion of the axle D' being a part of D, all have the same motion and work independent of the wheel C. The wheel C, with the sleeve F keyed in the hub C' of wheel C, has an independent rotary motion around D'.

The journal-brass $F^2$ always rests on top of the sleeve F, leaving the sleeve F free to turn under $F^2$. The contact between $F^2$ and F and between D' and F is continuously lubricated by the oil in the journal-box E.

The sleeve F, fitting around D', is in two parts bolted together by $F^3$, Fig. 3. The different parts of Fig. 3 can be removed and others adjusted in place.

I am aware that prior to my invention railway-car trucks have been made with both wheels rigid with the axle; but I am not aware that a truck has been made where one wheel is fixed to the axle and the companion wheel is journaled loosely. I therefore do not claim such a combination broadly; but What I do claim as my invention, and desire to secure by Letters Patent, is—

The combination of an axle-spindle provided with a shoulder at its outer end and a collar at its inner end, a wheel, a sleeve about the spindle and fixed to the hub of the wheel and bearing at its inner end against the collar and provided at its outer end with a flange, an axle-box supported by the sleeve, and a bearing-brass between the top of the box and upper surface of the sleeve and held in position by the collar at the outer end of the sleeve, substantially as described.

In testimony whereof I have signed my name to this specification in the presence of two subscribing witnesses.

ROBERT D'UNGER.

Witnesses:
CHILTON P. WILSON,
FREDERICK Z. MARX.